(12) United States Patent
Gibbs et al.

(10) Patent No.: US 7,365,519 B2
(45) Date of Patent: Apr. 29, 2008

(54) EXCITATION SYSTEM HAVING INNER LOOP VOLTAGE REGULATOR WITH BY-PASS CAPABILITY

(75) Inventors: Irving A. Gibbs, Fletcher, NC (US); Charles R. Mummert, Hendersonville, NC (US)

(73) Assignee: Basler Electric Company, Highland, IL (US)

( * ) Notice: Subject to any disclaimer, the term of this patent is extended or adjusted under 35 U.S.C. 154(b) by 0 days.

(21) Appl. No.: 11/100,368

(22) Filed: Apr. 6, 2005

(65) Prior Publication Data

US 2006/0226815 A1    Oct. 12, 2006

(51) Int. Cl.
*H02P 9/10*    (2006.01)
(52) U.S. Cl. .......................................... 322/28; 322/59
(58) Field of Classification Search ................... 322/25, 322/27, 28, 37, 59; 310/112; 290/4 R, 4 C
See application file for complete search history.

(56) References Cited

U.S. PATENT DOCUMENTS

| 4,599,552 | A |   | 7/1986 | Phillips et al. |
|---|---|---|---|---|
| 4,604,565 | A | * | 8/1986 | Yokota et al. ............... 320/123 |
| 4,788,486 | A | * | 11/1988 | Mashino et al. ............ 320/123 |
| 4,788,653 | A |   | 11/1988 | Henderson et al. |
| 5,097,165 | A | * | 3/1992 | Mashino et al. ............ 310/112 |
| 5,233,229 | A | * | 8/1993 | Kohl et al. ................. 307/10.1 |
| 5,600,232 | A | * | 2/1997 | Eavenson et al. ............. 322/12 |
| 5,604,420 | A |   | 2/1997 | Nambu |
| 5,723,972 | A | * | 3/1998 | Bartol et al. .................. 322/15 |
| 5,739,676 | A | * | 4/1998 | Judge et al. ................... 322/22 |
| 6,044,923 | A | * | 4/2000 | Reagan et al. ............. 180/65.4 |
| 6,046,917 | A |   | 4/2000 | Gibbs et al. |
| 6,281,664 | B1 | * | 8/2001 | Nakamura et al. ............ 322/22 |
| 6,369,549 | B1 | * | 4/2002 | Brefeld et al. ................ 322/11 |
| 6,396,247 | B1 |   | 5/2002 | Gibbs et al. |
| 6,525,504 | B1 |   | 2/2003 | Nygren et al. |
| 6,762,512 | B2 |   | 7/2004 | Nelson |

* cited by examiner

*Primary Examiner*—Nicholas Ponomarenko
(74) *Attorney, Agent, or Firm*—Thompson Coburn LLP; Kevin M. Kercher, Esq.

(57) ABSTRACT

An excitation system that includes an exciter for generating a field voltage for a rotor, a first automatic voltage regulator and a second automatic voltage regulator. The first regulator receives an output voltage of the power generation system as an input, and the second regulator receives the field voltage as an input. An output of the first regulator is provided as a second input to the second regulator. The first regulator is in selective electrical communication with the exciter through a first line conductor having first separable contacts such that an output of the first regulator may be selectively provided as an input to the exciter. The second regulator is in selective electrical communication with the exciter through a second line conductor having second separable contacts such that an output of the second regulator may be selectively provided as an input to the exciter.

7 Claims, 1 Drawing Sheet

EXCITATION SYSTEM HAVING INNER LOOP VOLTAGE REGULATOR WITH BY-PASS CAPABILITY

BACKGROUND OF THE INVENTION

1. Field of the Invention

The present invention relates to an excitation system for a synchronous electric power generator system, and in particular to an excitation system for a synchronous electric power generator system having by-pass capability.

2. Background Information

Synchronous electric power generators systems are well-known in the art and are used to produce alternating current output voltages, such as single phase or three phase voltage outputs. An example of a prior art synchronous electric power generator system is shown in FIG. 1 at numeral 5. As shown in FIG. 1, a typical synchronous electric power generator system includes an AC generator 10, coupled to power system 12, that has a stator 15 and a rotor 20 having a field winding excited by a field voltage provided by an exciter 25, which commonly includes a plurality of SCR bridges, such as is described in U.S. Pat. No. 6,046,917, entitled "Controlled Rectifier Bridge and System," owned by the assignee of the present invention and incorporated herein by reference. Current in the rotor 20 creates a rotating magnetic field which induces current in the stator 15 to produce an output voltage at the terminals of the stator 15. The amount of field voltage provided by the exciter 25 controls the generator field magnetic strength. As the main generator field strength is controlled, so is the generator output voltage induced in the generator stator 15. In the typical case, the exciter 25 is under the control of an automatic voltage regulator 30, known in the art, which is connected to the output voltage terminals of the stator 15 by system voltage transducer 35. The automatic voltage regulator 30 controls the voltage applied to the exciter 25 which adjusts the generator output voltage by controlling the strength of the main generator field. Many different techniques are used to sample or sense the output voltage and provide feedback to the automatic voltage regulator 30, one example of which includes detecting the peak of every other half cycle of the output voltage, comparing it with a desired reference value, and then adjusting the exciter voltage up or down as required to correct the generator output voltage. This type of feedback control system is known in the art as an outer loop voltage regulator.

It is also known in the art that what is known as an inner loop voltage regulator system may be used to linearize the firing circuit control for the exciter 25. When an inner loop voltage regulator system is employed in a synchronous electric power generator system 5, the system further includes automatic voltage regulator 40 as shown in FIG. 1. Automatic voltage regulator 40 is connected to the output of the exciter 25 by a field voltage transducer 45 in order to receive the field voltage as an input. The reference for the automatic voltage regulator 40 is the output of the automatic voltage regulator 30.

The problem with the synchronous electric power generator system 5 shown in FIG. 1 is that, if field voltage transducer 45 fails, then the outer loop voltage regulator system is no longer functional. Thus, there is a need for a system that will enable continued operation of a synchronous electric power generator system in the event that the inner loop voltage regulator system becomes non-functional, such as from the failure of a field voltage transducer like field voltage transducer 45.

SUMMARY OF THE INVENTION

The present invention relates to an excitation system for a power generation system that compensates for conditions in which an inner loop voltage regulator system becomes non-functional. The system includes an exciter for generating a field voltage for exciting a rotor of the power generation system, a first automatic voltage regulator and a second automatic voltage regulator. The first automatic voltage regulator receives an output voltage of the power generation system as an input, and the second automatic voltage regulator receives the field voltage as a first input and preferably a reference voltage as a second input. An output of the first automatic voltage regulator is provided as a second input to the second automatic voltage regulator. In addition, the first automatic voltage regulator is in selective electrical communication with the exciter through a first line conductor having first separable contacts such that an output of the first automatic voltage regulator may be selectively provided as an input to the exciter. The second automatic voltage regulator is in selective electrical communication with the exciter through a second line conductor having second separable contacts such that an output of the second automatic voltage regulator may be selectively provided as an input to the exciter. As will be appreciated, the second voltage regulator forms part of an inner loop voltage regulator system. Under normal operating conditions, the second separable contacts are in a closed condition and the first separable contacts are in an open condition. The second separable contacts are moved to an open condition and the first separable contacts are moved to a closed condition in response to a condition that adversely effects the operation of the inner loop voltage regulator system.

The present invention also relates to a method of generating a field voltage for exciting a rotor of a power generation system. The method includes generating a first voltage regulated signal using an output voltage of the power generation system and a reference voltage, generating a second voltage regulated signal using the first voltage regulated signal and the field voltage, and generating the field voltage by selectively using either the first voltage regulated signal or the second voltage regulated signal. The field voltage is preferably generated by an exciter, and the step of generating the field voltage comprises selectively providing either the first voltage regulated signal or the second voltage regulated signal as an input to the exciter. Preferably, the second voltage regulated signal is used under normal operating conditions and the first voltage regulated signal is used under conditions that adversely effect the generation of the second voltage regulated signal.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
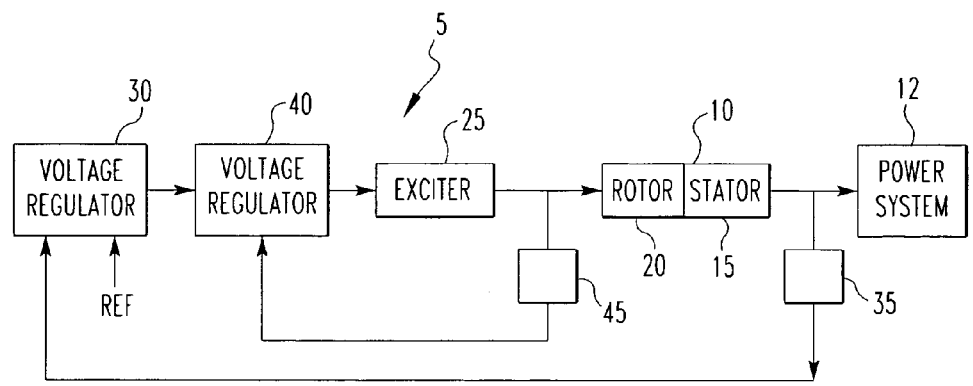
FIG. 1 is a block diagram of a prior art synchronous electric power generation system utilizing an outer loop voltage regulation system and an inner loop voltage regulation system.
Figure 2:
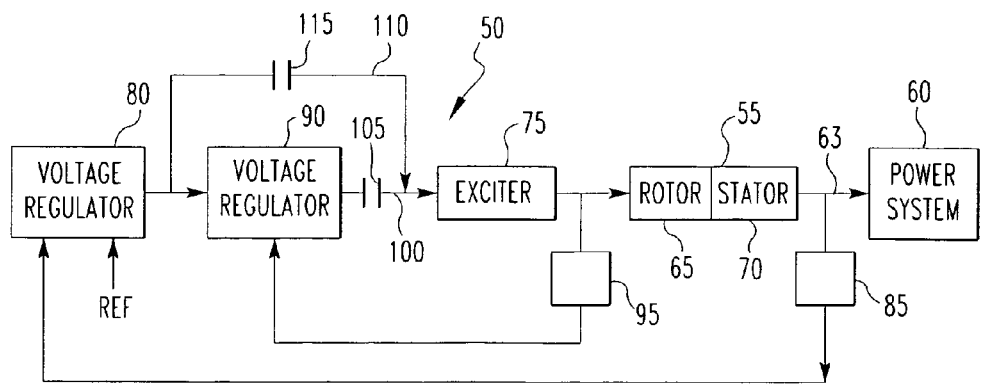
FIG. 2 is a block diagram of a synchronous electric power generation system utilizing an outer loop voltage regulation system and an inner loop voltage regulation system with by-pass capability according to the present invention.

FIG. 2 is a block diagram of synchronous electric power generation system 50 according to the present invention. Synchronous electric power generation system 50 includes an AC generator 55, typically a three-phase, 60 hertz (Hz) turbine generator, which is coupled to a power utility system 60 via a three-phase transmission line 63. In some countries, 50 hertz electrical power is more common. As seen in FIG. 2, AC generator 55 includes rotor 65 and stator 70. The field winding of rotor 65 is excited by a field voltage provided by exciter 75. Exciter 75 is under the control of an outer loop voltage regulator system consisting of automatic voltage regulator 80 connected to the output voltage terminals of the stator 70 by system voltage transducer 85. As discussed above, the automatic voltage regulator 80 controls the voltage applied to the exciter 75, which in turn adjusts the generator output voltage by controlling the strength of the main generator field. In addition, synchronous electric power generator system 50 includes an inner loop voltage regulator system to linearize the firing circuit control for the exciter 75. The inner loop voltage regulator system includes automatic voltage regulator 90 connected to the output of the exciter 75 by a field voltage transducer 95. The reference for the automatic voltage regulator 90 is the output of the automatic voltage regulator 80. In an alternate embodiment, a power system stabilizer (PSS), such as is known in the art, may be provided between system voltage transducer 85 and automatic voltage regulator 80 to provide a signal for damping undesired electromechanical oscillation modes.

According to an aspect of the present invention, the automatic voltage regulator 90 is in selective electrical communication with the exciter 75 by way of line conductor 100. Line conductor 100 includes separable contacts 105 that may be selectively opened and closed under the control of a computer control system associated with electric power generation system 50, to selectively bring automatic voltage regulator 90 and exciter 75 into and out of electrical communication with one another. In addition, automatic voltage regulator 80 is in selective electrical communication with exciter 75 by way of by-pass line conductor 110. By-pass line conductor 110 includes contacts 115 that may be selectively opened and closed under the control of computer control system, to selectively bring automatic voltage regulator 80 and exciter 75 into and out of electrical communication with one another. Under normal operating conditions, separable contacts 105 are closed, thereby connecting automatic voltage regulator 90 to exciter 75, and separable contacts 1115 are open. In the event of a condition that would render the inner loop voltage regulator system inoperable, such as the failure of field voltage transducer 95 or automatic voltage regulator 90, or the like, separable contacts 105 may be opened and separable contacts 15 may be closed. As a result, the inner loop voltage regulator system, and in particular automatic voltage regulator 90, will be by-passed, thereby allowing continued operation of synchronous electric power generation system 50. In that situation, automatic voltage regulator 80 is directly connected to exciter 75 by way of by-pass line conductor 10, and provides firing circuit control for the exciter 75 without the linearization provided by the inner loop voltage regulator system. Separable contacts 105 and 115 may be any type of known selectively openable electrical contacts, such as, without limitation, any of a number of known electronically controlled switches.

While specific embodiments of the invention have been described in detail, it will be appreciated by those skilled in the art of various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An excitation system for a power generation system, comprising:

an exciter, said exciter generating a field voltage for exciting a rotor of said power generation system;

a first automatic voltage regulator, said first automatic voltage regulator receiving an output voltage of said power generation system as an input; and a second automatic voltage regulator, said second automatic voltage regulator receiving said field voltage as a first input;

wherein an output of said first automatic voltage regulator is provided as a second input to said second automatic voltage regulator, wherein said first automatic voltage regulator is in selective electrical communication with said exciter through a first line conductor having first separable contacts such that an output of said first automatic voltage regulator may be selectively provided as an input to said exciter, and wherein said second automatic voltage regulator is in selective electrical communication with said exciter through a second line conductor having second separable contacts such that an output of said second automatic voltage regulator may be selectively provided as an input to said exciter.

2. The excitation control system according to claim 1, wherein said first separable contacts and said second separable contacts each comprise an electronically controlled switch.

3. The excitation control system according to claim 1, wherein said first voltage regulator receives a reference voltage as a second input thereto.

4. The excitation control system according to claim 1, wherein said second voltage regulator forms part of an inner loop voltage regulator system, wherein under normal operating conditions said second separable contacts are in a closed condition and said first separable contacts are in an open condition, and wherein said second separable contacts are moved to an open condition and said first separable contacts are moved to a closed condition in response to a condition that adversely effects the operation of said inner loop voltage regulator system.

5. A method of generating a field voltage for exciting a rotor of a power generation system, comprising:

generating a first voltage regulated signal using an output voltage of said power generation system and a reference voltage;

generating a second voltage regulated signal using said first voltage regulated signal and said field voltage; and generating said field voltage by selectively using either said first voltage regulated signal or said second voltage regulated signal.

6. The method according to claim 5, said field voltage being generated by an exciter, said step of generating said field voltage comprising selectively providing either said first voltage regulated signal or said second voltage regulated signal as an input to said exciter.

7. The method according to claim 5, said step of generating said field voltage comprising using said second voltage regulated signal under normal operating conditions and said first voltage regulated signal under conditions that adversely effect the generation of said second voltage regulated signal.

* * * * *